US009426904B2

(12) United States Patent
Fitzsimmons et al.

(10) Patent No.: US 9,426,904 B2
(45) Date of Patent: Aug. 23, 2016

(54) COMMUNICATION DEVICE IN WHICH AN UNAUTHORIZED REMOVAL OF AN ELECTRICAL CONNECTOR IS DETECTED

(71) Applicant: HARRIS CORPORATION, Melbourne, FL (US)

(72) Inventors: Cory N. Fitzsimmons, Avon, NY (US); David Cipolla, Macedon, NY (US); Jason Scott, W. Henrietta, NY (US)

(73) Assignee: Harris Corporation, Melbourne, FL (US)

( * ) Notice: Subject to any disclaimer, the term of this patent is extended or adjusted under 35 U.S.C. 154(b) by 236 days.

(21) Appl. No.: 14/326,645

(22) Filed: Jul. 9, 2014

(65) Prior Publication Data
US 2016/0011250 A1    Jan. 14, 2016

(51) Int. Cl.
| H05K 5/00 | (2006.01) |
| G06F 21/88 | (2013.01) |
| H05K 1/02 | (2006.01) |
| G01R 31/04 | (2006.01) |
| H05K 5/02 | (2006.01) |
| G01R 31/02 | (2006.01) |

(52) U.S. Cl.
CPC ........... *H05K 5/0026* (2013.01); *G01R 31/046* (2013.01); *G06F 21/88* (2013.01); *H05K 1/0275* (2013.01); *H05K 5/0208* (2013.01); *G01R 31/026* (2013.01); *H01R 2201/24* (2013.01)

(58) Field of Classification Search
CPC ....................................................... G06F 21/88
See application file for complete search history.

(56) References Cited

U.S. PATENT DOCUMENTS

| 4,149,158 A * | 4/1979 | Iwaoka | G08B 25/085 340/506 |
| 5,621,387 A * | 4/1997 | Phillips | G08B 29/10 174/520 |
| 5,790,670 A * | 8/1998 | Bramlett | G08B 13/1409 200/43.09 |
| 5,991,164 A * | 11/1999 | Saito | H01T 4/08 174/51 |
| 6,087,939 A * | 7/2000 | Leyden | G08B 13/1463 340/568.1 |
| 6,469,626 B1 * | 10/2002 | Hung | G08B 13/149 340/568.1 |
| 6,512,454 B2 * | 1/2003 | Miglioli | G08B 13/149 340/541 |
| 6,774,807 B1 * | 8/2004 | Lehfeldt | G08B 29/046 324/110 |

(Continued)

FOREIGN PATENT DOCUMENTS

| FR | 2 875 036 A1 | 3/2006 |
| WO | 2013/042108 A1 | 3/2013 |

OTHER PUBLICATIONS

Extended European Search Report dated Nov. 5, 2015 for European Patent Application No. EP 15 00 1896.

*Primary Examiner* — Adrian S Wilson
(74) *Attorney, Agent, or Firm* — Fox Rothschild, LLP; Robert J. Sacco; Carol E. Thorstad-Forsyth

(57) ABSTRACT

Systems (100) and methods (1400) for detecting removal and attempted removals of an electronic component from an electronic device. The methods comprising: disposing the electronic component (112) on the electronic device such that a conductive surface of the electronic component contacts a ground conductor (802) disposed on a first surface (812) of an internal circuit board (500); using an electromechanical member (700) to mechanically couple the electronic component to the internal circuit board and to create an electrical path from the ground conductor to a sensing conductor (800) disposed on a second surface (814) opposed from the first surface of the internal circuit board; and sensing a break in the electrical path.

18 Claims, 11 Drawing Sheets

(56) References Cited

U.S. PATENT DOCUMENTS

| | | | | |
|---|---|---|---|---|
| 7,049,970 B2 * | 5/2006 | Allen | ............... | G08B 13/126 340/568.2 |
| 7,835,534 B2 * | 11/2010 | Cole, Jr. | ............... | A45C 11/20 219/717 |
| 8,553,425 B2 * | 10/2013 | Li | ............... | G06F 1/18 361/679.57 |
| 2002/0154023 A1 | 10/2002 | Hazan | | |
| 2005/0170872 A1 * | 8/2005 | Vuori | ............... | H04M 1/72575 455/575.8 |
| 2008/0074851 A1 * | 3/2008 | Hoff | ............... | G06F 3/023 361/747 |

* cited by examiner

COMMUNICATION DEVICE IN WHICH AN UNAUTHORIZED REMOVAL OF AN ELECTRICAL CONNECTOR IS DETECTED

BACKGROUND OF THE INVENTION

Statement of the Technical Field

The inventive arrangements relate to communication devices. More particularly, the invention concerns communication devices in which an unauthorized removal of an electrical connector is detected.

DESCRIPTION OF THE RELATED ART

There are many communication devices known in the art. At least one of these communication devices implements a means to detect when an electrical connector has been decoupled therefrom. This means includes a Commercial Off The Shelf ("COTS") switch. When the electrical connector is coupled to the communication device, a button of the switch is depressed thereby. The button is released upon decoupling of the electrical connector from the communication device. In this way, the communication device can detect when a malicious attempt to obtain access to the internal circuitry of the communication device occurs by forcefully removing the electrical connector therefrom.

Despite the advantages the COTS switch arrangement, it suffers from certain disadvantages. For example, actuation of the COTS switch may occur in response to shock and/or vibration applied thereto and/or to the communication device. Also, the COTS switch is relatively costly and has certain Design For Manufacturing ("DFM") issues associated therewith. The DFM issues relate to the tight tolerances needed to ensure applicable plunger actuation ranges.

SUMMARY OF THE INVENTION

The present invention concern systems and methods for detecting removal and attempted removals of an electronic component (e.g., an input/output connector for an accessory) from an electronic device (e.g., a manpack radio). The methods involve: disposing the electronic component on the electronic device such that a conductive surface of the electronic component contacts a ground conductor disposed on a first surface of an internal circuit board; using an electro-mechanical member to mechanically couple the electronic component to the internal circuit board and to create an electrical path from the ground conductor to a sensing conductor disposed on a second surface opposed from the first surface of the internal circuit board; and sensing a break in the electrical path.

The break in the electrical path is detected when a voltage supplied to a detector circuit of the electronic device is higher as compared to a voltage supplied to the detector circuit when the electrical path is not broken. The voltage change may occur when the electro-mechanical member breaks in response to an application of a force to the electronic component. Additionally or alternatively, the voltage change may occur when a first portion of the internal circuit board adjacent to the sensing conductor breaks away from a remaining second portion of the internal circuit board, in response to an application of a force to the electronic component.

In some scenarios, the electro-mechanical member comprises a screw that passes through an aperture formed through the internal circuit board and threadingly engages a mounting aperture formed in the electronic component. The screw is selected to break under a first tensile load which is lower as compared to a tensile load needed for breaking a coupler used to mechanically couple the electronic component to a housing of the electronic device.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
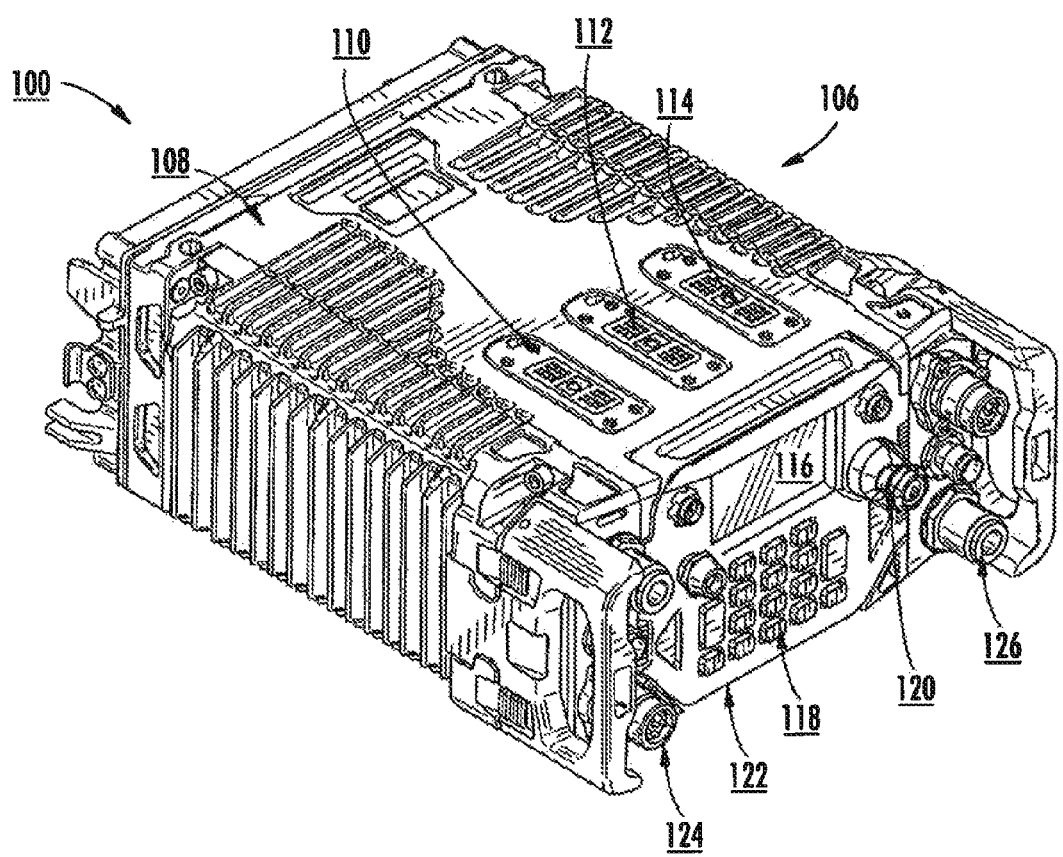
FIG. 1 provides a front perspective view of an exemplary communication device with electro-mechanical detection of accessory removal.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects as illustrative. The scope of the invention is, therefore, indicated by the appended claims. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

OVERVIEW

The present invention concerns systems and methods for detecting a forceful removal of an electronic component from a communication device. The methods involve: disposing an electronic component on an electronic device such that a conductive surface of the electronic component contacts a ground conductor disposed on a first surface of an internal circuit board; using an electro-mechanical member to mechanically couple the electronic component to the internal circuit board and to create an electrical path from the ground conductor to a sensing conductor disposed on a second surface opposed from the first surface of the internal circuit board; and sensing a break in the electrical path.

Notably, the present invention overcomes various drawbacks of conventional systems, such as that disclosed in the background section of this document. For example, the electro-mechanical techniques used herein, to detect the forceful removal of an electronic component from the communication device, eliminate the need for COTS switches. Therefore, the present invention provides a detection means which is less costly, more reliable and easier to manufacture than that of the conventional systems.

Communication Device

Figure 2:
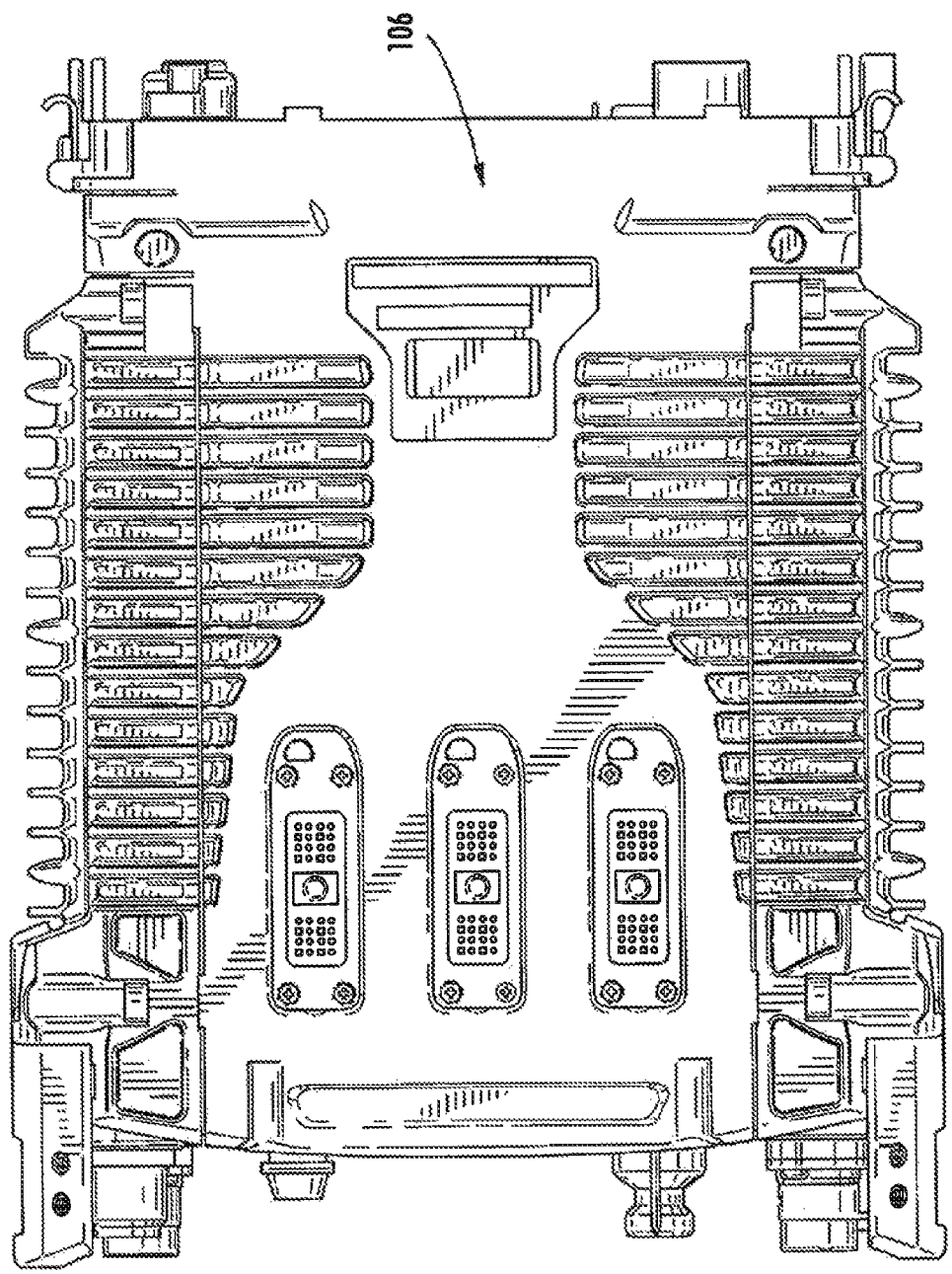
FIG. 2 is a top view of the communication device shown in FIG. 1.

Referring now to FIGS. 1-2, there is provided a schematic illustration of an exemplary communication device 100 that is useful for understanding the present invention. The communication device 100 is shown as comprising a portable manpack radio or man-portable, tactical software defined combat-net radio covering a predefined (e.g., 30-512 MHz) frequency range. The present invention is not limited in this regard. The communication device can alternatively comprise any type of communication device in which forceful attempts to remove an electronic component (e.g., an I/O connector) therefrom needs to be detected.

Figure 5:
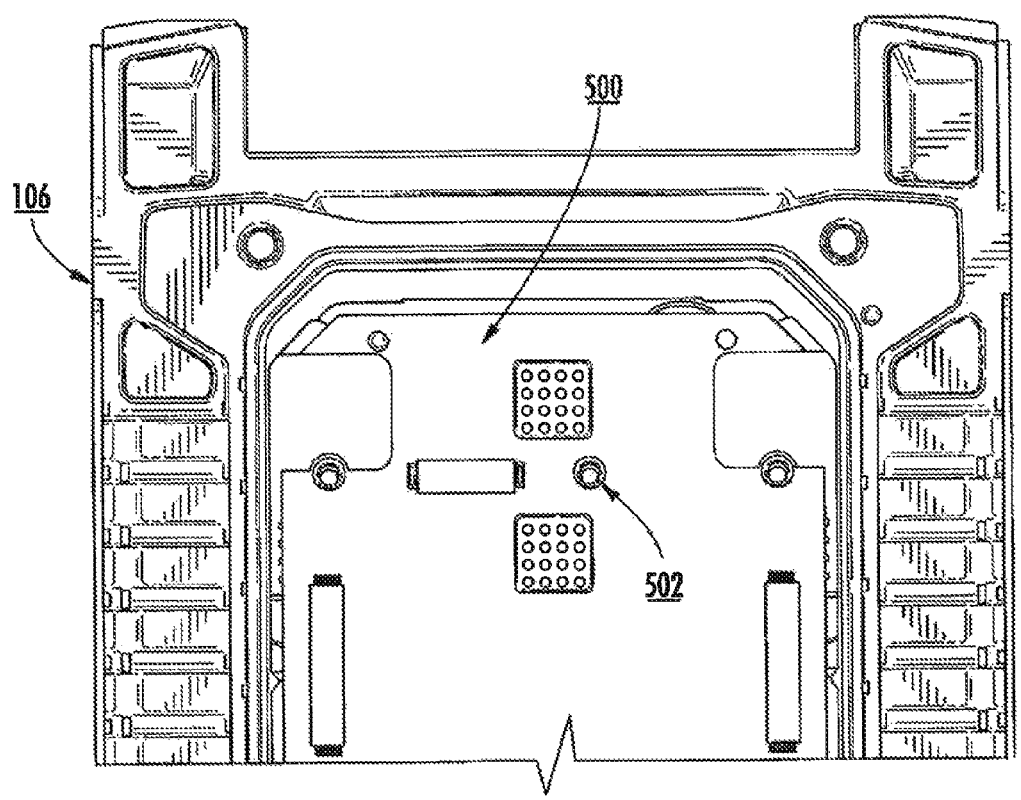
FIG. 5 is a schematic illustration of a Printed Circuit Board ("PCB") disposed within a housing of the communication device shown in FIGS. 1-2.

As shown in FIGS. 1-2, the communication device 100 comprises a housing 106 in which various electronic components are housed. The electronic components include, but are not limited to, transceivers, filters, switches, processors, data stores, and other hardware. The listed electronic components are well known in the art, and therefore will not be described herein. One or more of the listed electronic components may be disposed on a PCB housed inside the housing 106. A schematic illustration of a PCB 500 disposed in the housing 106 is provided in FIG. 5.

The communication device 100 also comprises various Input/Output ("I/O") components. For example, as shown in FIGS. 1-2, various I/O components 116-120 are also disposed on a front panel 122 of the communication device 100. The I/O components 116-120 include a display screen 116, a keypad 118, a knob 120, and a plurality of I/O connectors 124, 126. These I/O components 116-120 facilitate user-software interactions for controlling operations of the communication device 100.

A number of I/O components 110, 112, 114 are also disposed on a top panel 108 of the housing 106. The I/O components 110-114 include electronic connectors for accessories. As such, the I/O components 110, 112, 114 facilitate the attachment and detachment of accessories to the communication device 100. The accessories may include antennas, handsets, global positioning devices, external memory, testing modules, calibration modules, and lights. In this regard, the I/O components 110, 112, 114 are coupled to the PCB 500 disposed in the housing 106 so as to connect an attached accessory to the internal circuitry of the communication device 100.

Figure 3:
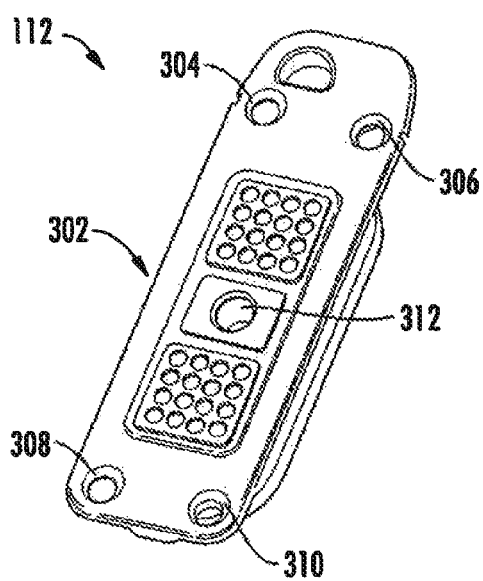
FIG. 3 is top perspective view of a connector shown in FIGS. 1-2.
Figure 4:
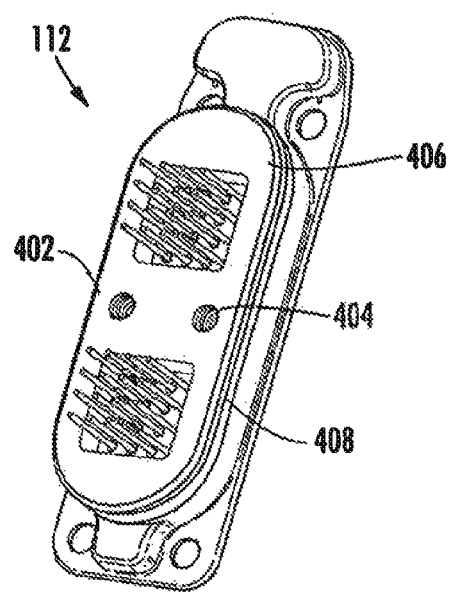
FIG. 4 is a bottom perspective view of the connector shown in FIGS. 1-3.

Schematic illustrations of an exemplary architecture for I/O connector 112 are provided in FIGS. 3-4. Each I/O component 110 and 114 is the same as or substantially similar to I/O connector 112. As such, the discussion of I/O connector 112 is sufficient for understanding I/O components 110 and 114.

As shown in FIGS. 3-4, the I/O connector 112 comprises a body 302 with four apertures 304, 306, 308, 310 formed therethrough. These apertures 304-310 are provided to facilitate (a) the mechanical mounting of the I/O connector 112 on an external surface of the communication device housing 106 via mounting screws and (b) the formation of an environmental seal between the I/O connector 112 and the housing 106. The environmental seal is at least partially achieved using a piston sealing member 408 disposed on the body 302 of the I/O connector 112. Piston sealing members are well known in the art, and therefore will not be described herein.

An accessory interface 312 is provided on the body 302 to which an electronic connector of an accessory can be coupled. Accessory interfaces are well known in the art, and therefore will not be described herein. Any known or to be known accessory interface that is suitable for a particular application can be used herein without limitation.

Two mounting apertures 402, 404 are formed on a bottom panel 406 of the body 302. These mounting apertures 402, 404 are provided to facilitate the coupling of at least one electro-mechanical detection mechanism to the I/O connector 112 such that a forceful detachment thereof from the housing can be detected. Exemplary electro-mechanical detection mechanisms will be described in detail below. Still, it should be understood that such electro-mechanical detection mechanisms comprise at least one screw which passes through an aperture 502 formed in the PWB 500 disposed in the communication device.

Figure 6:
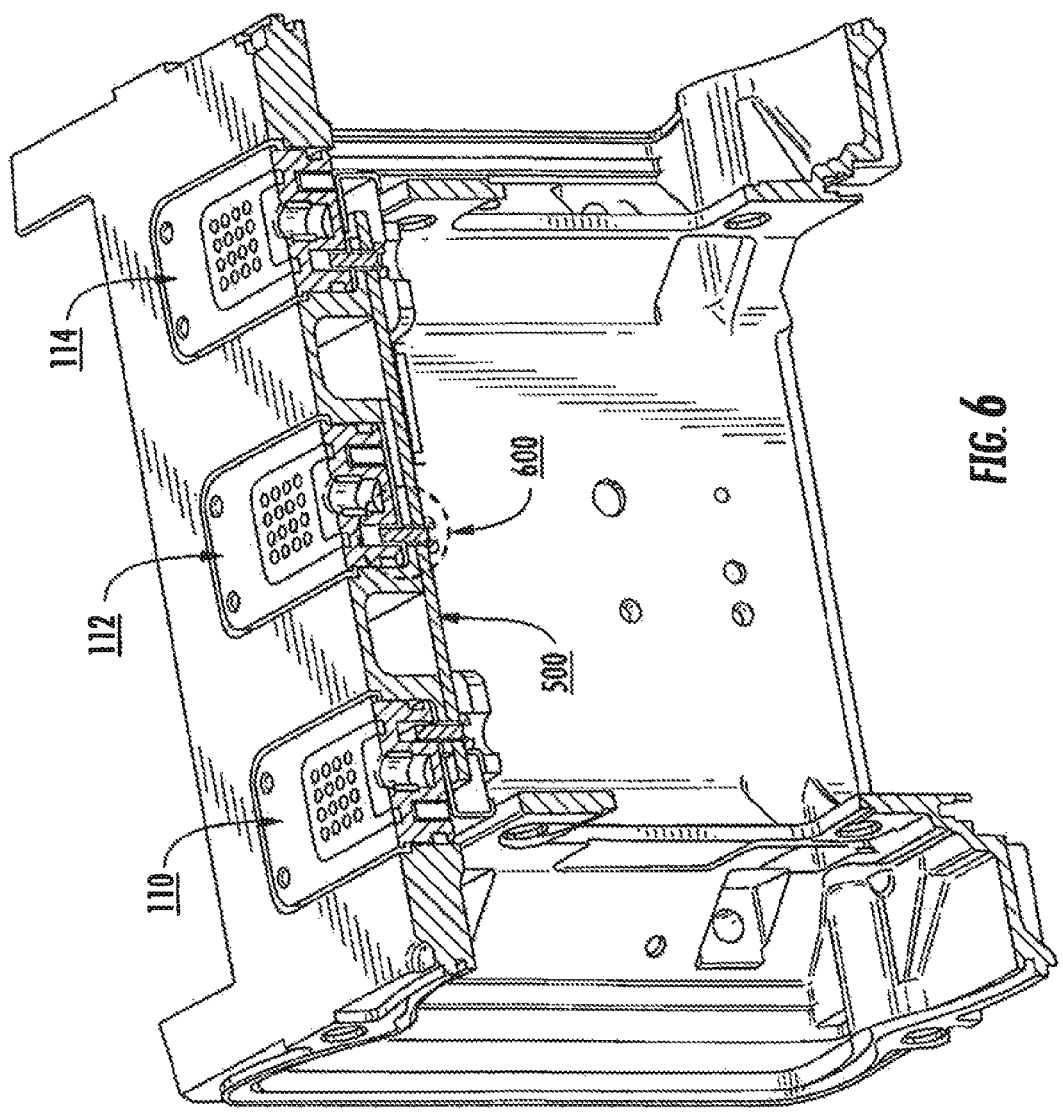
FIG. 6 is a cross-sectional view of the communication device shown in FIGS. 1-2 that is useful for understanding how a connector of the type shown in FIGS. 3-4 is coupled to the communications device.
Figure 7:
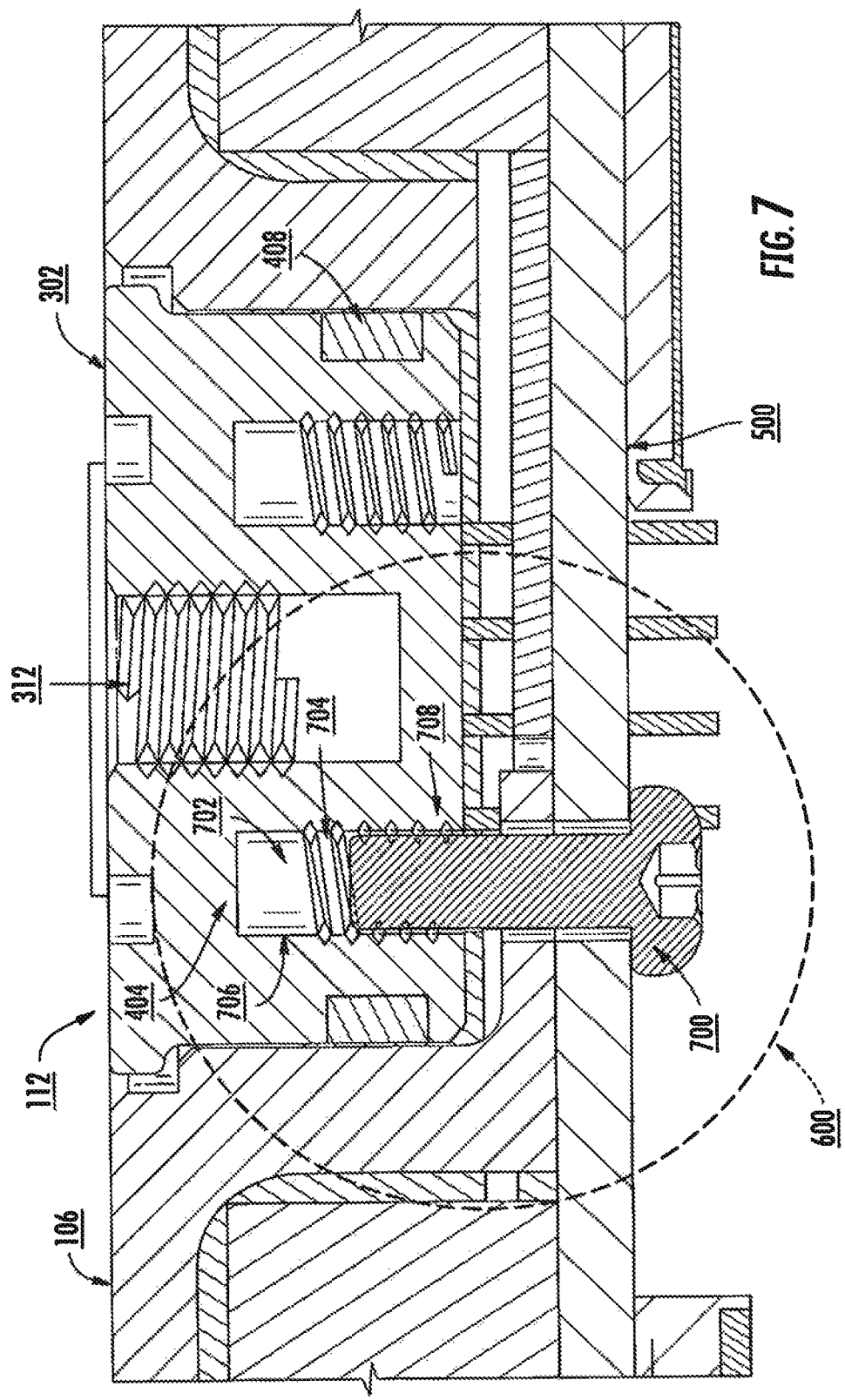
FIG. 7 is a schematic illustration that is useful for understanding how a connector of the type shown in FIGS. 3-4 is coupled to the communications device.

Referring now to FIGS. 6-7, there are provided schematic illustrations that are useful for understanding how the I/O components 110-114 are coupled thereto such that the forceful removal thereof may be detected. In the present case, an electro-mechanical detection mechanism 600 is used for making such detection. The electro-mechanical detection mechanism 600 will be discussed herein in relation to I/O component 112. The same or similar electro-mechanical detection mechanism is used with I/O components 110 and 114.

The electro-mechanical detection mechanism 600 comprises an elongate electro-mechanical member 700 which passes through the PWB 500 into a mounting aperture 404. In this way, the electro-mechanical member 700 contacts both the PWB 500 and a mechanical-electrical contact 702 of the I/O component 112. The mechanical-electrical contact 702 comprises threads 704 formed on an inner surface 706 of the mounting aperture 404. Accordingly, the electro-mechanical member 700 has corresponding threads 708 formed on an outer surface thereof for mechanically engaging the threads 704 of the mounting aperture 404. In some scenarios, the electro-mechanical member 700 comprises a screw.

As should be understood, the communication device 100 has certain size requirements. Thus, the electro-mechanical member 700 is selected to have as small as size as possible so as to minimize the amount of space needed therefore inside the communication device 100.

If the mechanical aspects of the electro-mechanical member 700 are only relied upon, then an external screw having more tension force than the electro-mechanical member 700 (when it comes to the shear strength thereof) could be used to break the internal electro-mechanical member 700. This is evident from the following discussion.

Mathematical Equation (1) provides a way to compute the load needed to break the threaded part of a #6-32 screw. Mathematical Equation (2) provides a way to compute the load needed to break a threaded part 708 of a #2-56 screw.

$$P = \sigma_y \cdot A_t = 913.88 \text{ lbs} \tag{1}$$

$$P = \sigma_y \cdot A_t = 295.70 \text{ lbs} \tag{2}$$

P represents the direct axial tensile load to break a threaded portion of a screw. This is a maximum Von Mises stress comprised of the principle stresses and shear (torsional stresses) that are not calculated here.

If the electro-mechanical member 700 is selected to comprise a #2-56 screw, a user could remove the I/O component 112 simply by applying enough force to the outside of the I/O component 112 so as to cause breaking of the internal electro-mechanical member 700. This force can be applied using a #6-32 screw coupled to the I/O component 112 via the accessory interface 312. Once the I/O component 112 has been removed, the user could tamper with the internal circuitry of the communication device 100. Thereafter, the I/O component 112 could then be mounted once again to the communication device 100 via the four external mounting screws. In this scenario, such tampering of the communication device 100 would not be detected.

Therefore, in addition to the mechanical aspects of the electro-mechanical member 700, the present invention relies upon the conductive aspects thereof. The conductive aspects of the electro-mechanical member 700 facilitate the provision of a means to detect a breaking thereof. This will become more evident from the following discussion of FIGS. 8-9.

Figure 8:
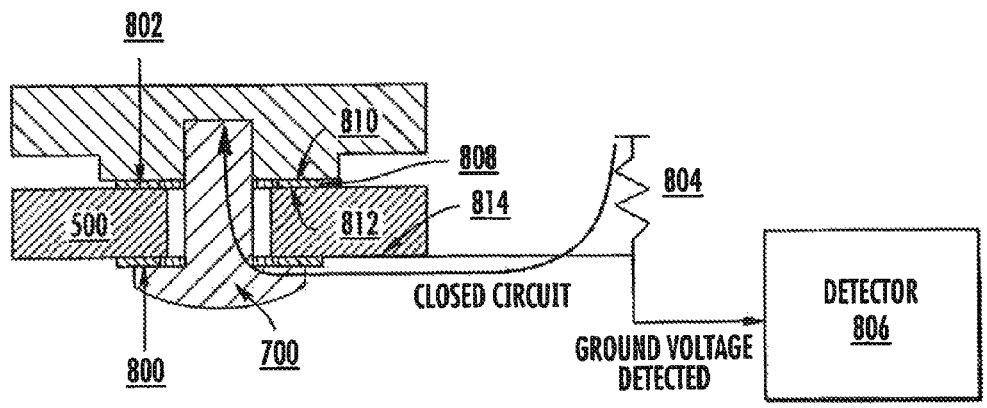
FIGS. 8-9 provide schematic illustrations that are useful for understanding one forceful removal of an electrical connector can be detected.

As shown in FIG. 8, a ground connection 802 to the I/O component 112 is electrically detected through the electro-mechanical member 700. In this regard, a grounded conductor 808 is disposed on a first surface 812 of the PCB 500. The grounded conductor 808 is in electrical contact with a conductive surface 810 of the I/O component 112. The conductive surface 810 is also in electrical contact with the electro-mechanical member 700. The electro-mechanical member 700 electrically contacts a sensing conductor 800 disposed on a second surface 814 of the PCB 500. The sensing conductor 800 and a pull-up resistor 804 are coupled to a detector 806. The detector 806 comprises software and/or hardware configured to sense when current flows through or ceases flowing through the electro-mechanical member 700.

Figure 9:
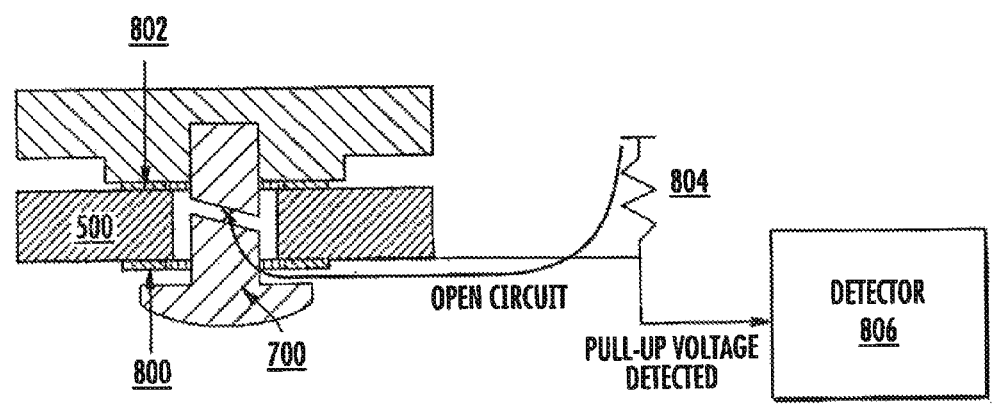

When the electro-mechanical member 700 breaks, there will no longer be continuity between the sensing conductor 800 and ground, as shown in FIG. 9. In this case, the detector 806 senses a high pull-up voltage signal. When such detection occurs, the detector 806 determines that the electro-mechanical member 700 has been broken, and therefore the I/O component 112 may have been removed from the communication device 100 by an unauthorized and/or malicious individual. Upon such a determination, the detector 806 performs certain remedial measures.

The present invention is not limited to the detection technique described above for detecting when the I/O component has been removed from the communication device. Other detection techniques can be employed. For example, in addition to or alternative to the above described, detection technique, another detection technique can be employed which uses perforations 1002 in the PCB for causing a circuit trace thereof to break in response to the shearing of the electro-mechanical member. The particulars of this perforation based detection technique will become more evident as the discussion progresses. Still, it should be understood that the load required to break the PCB (based on the PCB thickness) is less than the load required to break the electro-mechanical member of the electro-mechanical detection mechanism. Thus, when a force is applied externally to the I/O connector the PCB will break instead of the electro-mechanical member.

Figure 10:
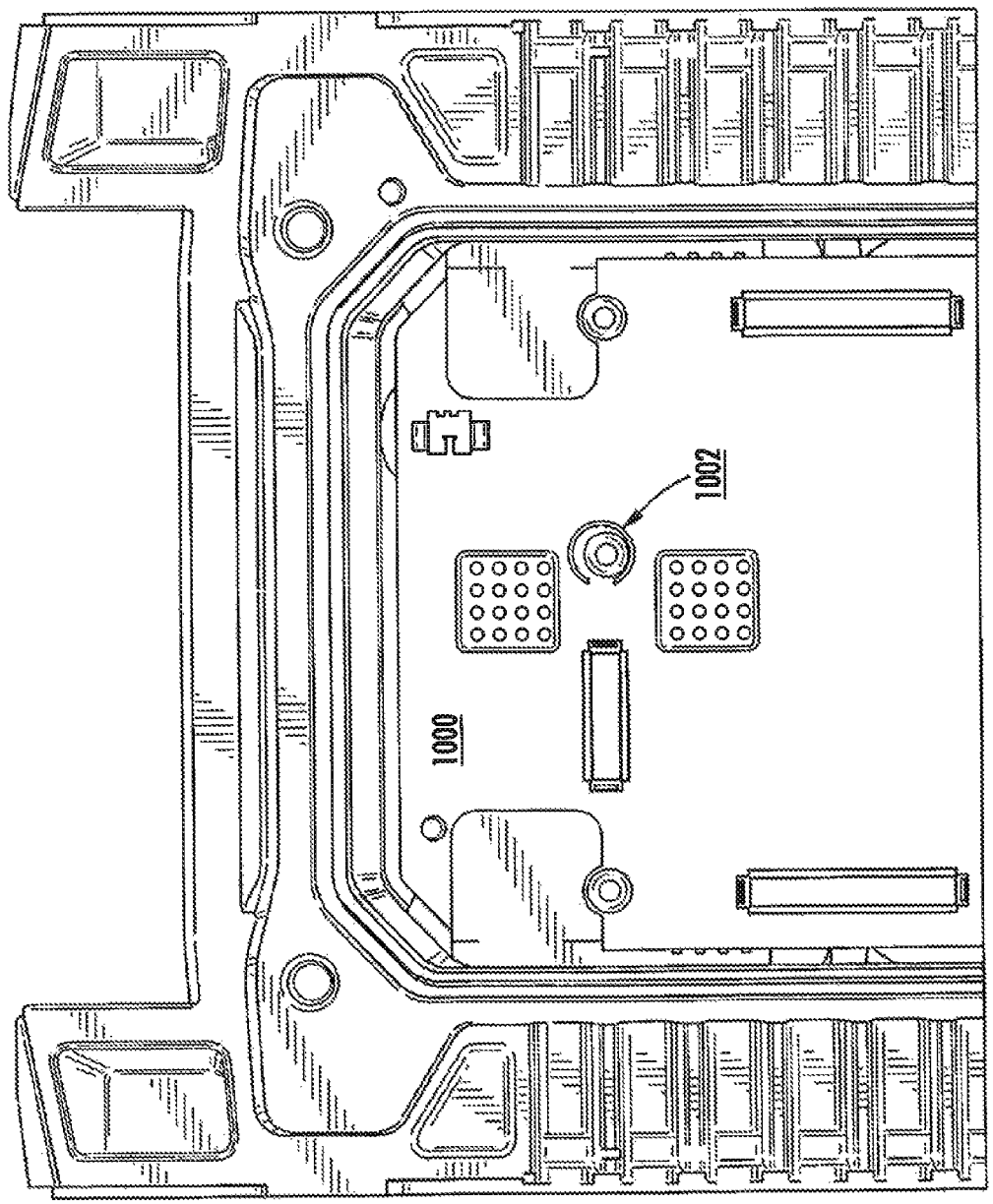
FIG. 10-13 provide schematic illustrations that are useful for understanding another way a forceful removal of an electrical connector can be detected.
Figure 11:
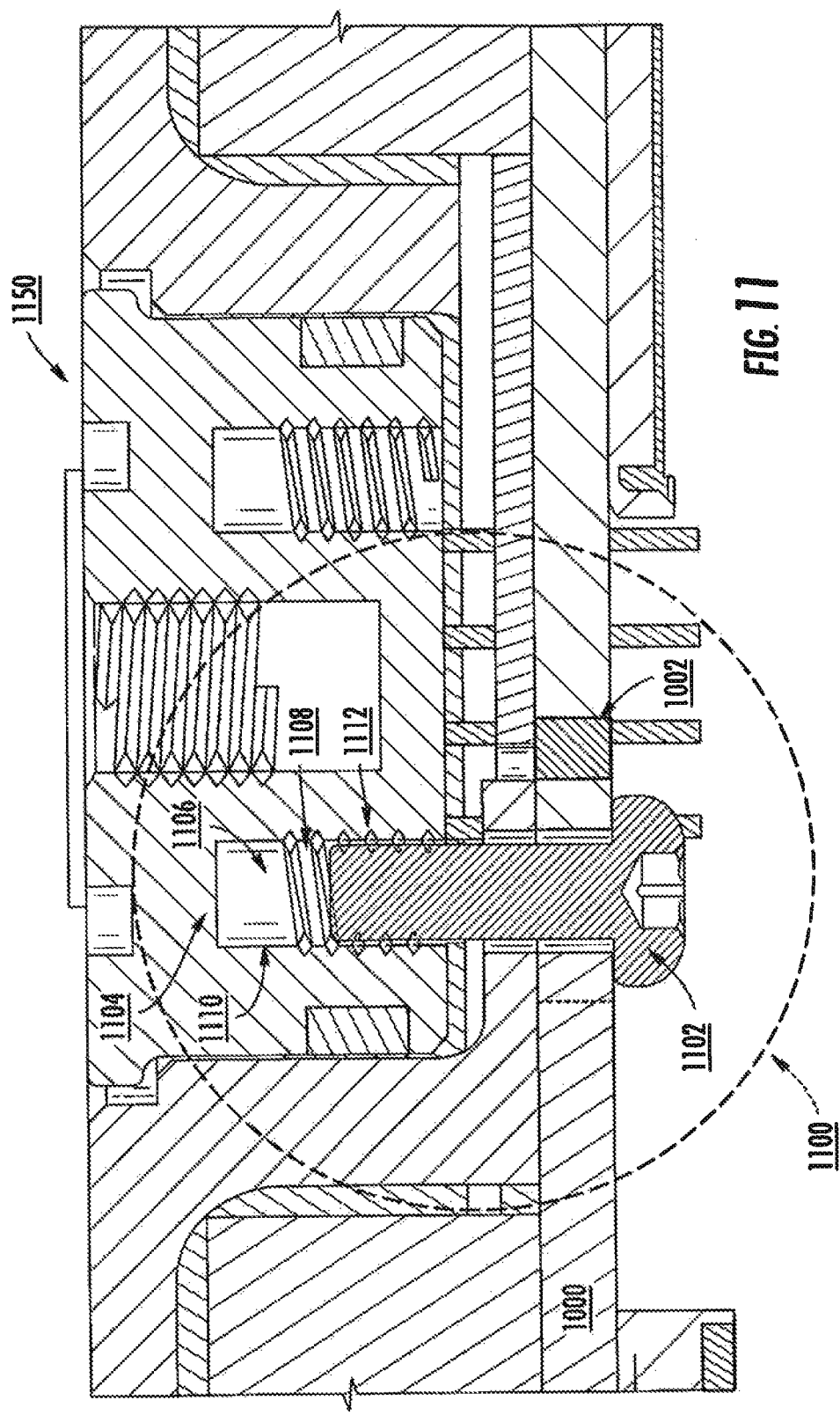

Referring now to FIGS. 10-11, there is provided schematic illustrations that are useful for understanding how the I/O components 110-114 are coupled to a communication device such that the forceful removal thereof may be detected in accordance with a perforation based detection technique. In the present case, an electro-mechanical detection mechanism 1100 is used for making such detection. The electro-mechanical detection mechanism 1100 will be discussed herein in relation to an I/O component 1150. The same or similar electro-mechanical detection mechanism may also be used with I/O components 110-114. As such, I/O component 1150 is the same as or similar to I/O components 110-114. Thus, the discussion provided above in relation to I/O components 110-114 is sufficient for understanding I/O component 1150.

The electro-mechanical detection mechanism 1100 comprises an elongate electro-mechanical member 1102 which passes through the PWB 1000 into a mounting aperture 1104. In this way, the electro-mechanical member 1102 contacts both the PWB 1000 and a mechanical-electrical contact 1106 of the I/O component 1150. The mechanical-electrical contact 1106 comprises threads 1108 formed on an inner surface 1110 of the mounting aperture 1104. Accordingly, the electro-mechanical member 1100 has corresponding threads 1112 formed on an outer surface thereof for mechanically engaging the threads 1108 of the mounting aperture 1104. In some scenarios, the electro-mechanical member 1100 comprises a screw.

Figure 12:
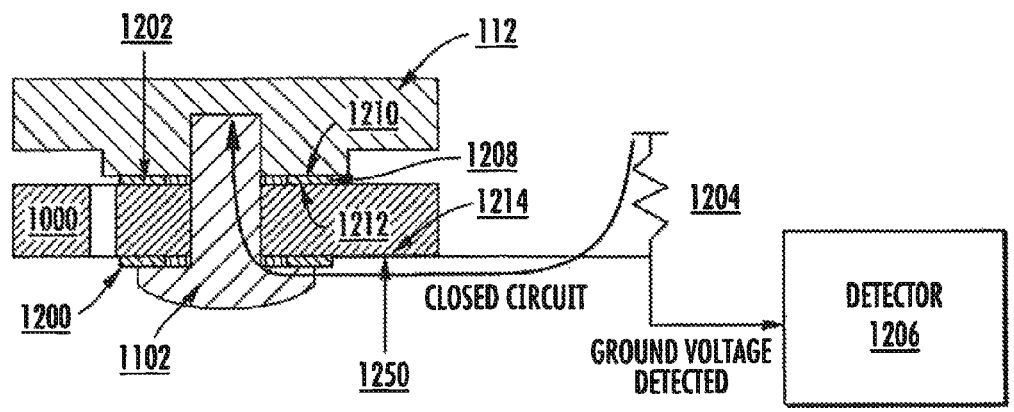

As shown in FIG. 12, a ground connection 1202 to the I/O component 1150 is electrically detected through the electromechanical member 1102. In this regard, a grounded conductor 1208 is disposed on a first surface 1212 of the PCB 1000. The grounded conductor 1208 is in electrical contact with a conductive surface 1210 of the I/O component 1150. The conductive surface 1210 is also in electrical contact with the electro-mechanical member 1100. The electro-mechanical member 1100 electrically contacts a sensing conductor 1200 disposed on a second surface 1214 of the PCB 1000. The sensing conductor 1200 and a pull-up resistor 1204 are coupled to a detector 1206. The detector 1206 senses when current flows through the electro-mechanical member 1100 towards the detector 1206.

Figure 13:
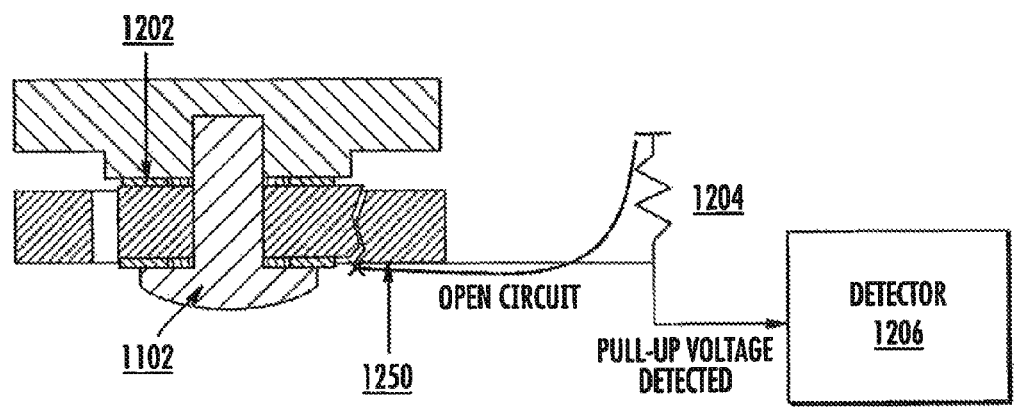

The PCB 1000 may be broken at point 1250 simply by applying enough force to the outside of the I/O component 1150. This force can be applied using a #6-32 screw coupled to the I/O component 1150 via the accessory interface thereof. When the PCB 1000 is broken at point 1250, there will no longer be continuity between the sensing conductor 1200 and the detector 1206, as shown in FIG. 13. In this case, the detector 1206 senses a high pull-up voltage signal. When such detection occurs, the detector 1206 determines that the PCB 1000 has been broken, and therefore the I/O component 1150 may have been removed from the communication device by an unauthorized and/or malicious individual. Upon such a determination, the detector 1206 performs certain remedial measures.

Exemplary Method

Figure 14:
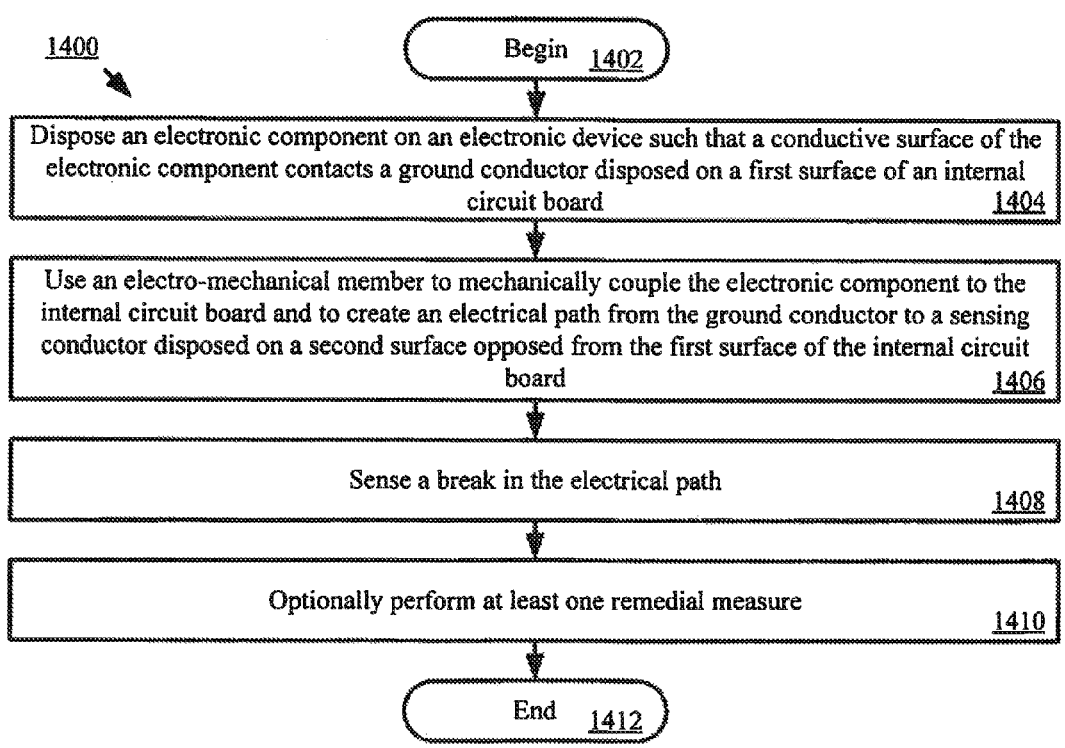
FIG. 14 is a flow diagram an exemplary method for detecting removal of an electronic component from an electronic device.

Referring now to FIG. 14, there is a flow diagram of an exemplary method 1400 for detecting removal of an electronic component (e.g., I/O component 112 of FIG. 1 or 1150 of FIG. 11) from an electronic device (e.g., communication device 100 of FIG. 1). The method 1400 begins with step 1402 and continues with step 1404. In step 1404, the electronic component is disposed on the electronic device such that a conductive surface of the electronic component contacts a ground conductor (e.g., ground conductor 802 of FIG. 8 or 1202 of FIG. 12) disposed on a first surface (e.g., surface 810 of FIG. 8 or 1210 of FIG. 12) of an internal circuit board (e.g., PCB 500 of FIG. 5 or 1000 of FIG. 10). Next in step 1406, an electro-mechanical member (e.g., electron-mechanical member 700 of FIG. 7 or 1102 of FIG. 11) is used to mechanically couple the electronic component to the internal circuit board. The electro-mechanical member is also used to create an electrical path from the ground conductor to a sensing conductor (e.g., conductor 800 of FIG. 8 or 1200 of FIG. 12) disposed on a second surface (e.g., surface 814 of FIG. 8 or 1214 of FIG. 12) opposed from the first surface of the internal circuit board. Upon completing step 1406, step 1408 is performed where a break in the electrical path is sensed. One or more remedial measures may then be performed, as shown by optional step 1410. Thereafter, step 1412 is performed where method 1400 ends.

In some scenarios, the break in the electrical path is detected when a voltage supplied to a detector circuit of the electronic device is higher as compared to a voltage supplied to the detector circuit when the electrical path is not broken. The voltage change may occur when the electro-mechanical member breaks in response to an application of a force to the electronic component. Additionally or alternatively, the voltage change may occur when a first portion of the internal circuit board adjacent to the sensing conductor breaks away from a remaining second portion of the internal circuit board, in response to an application of a force to the electronic component.

In those or other scenarios, the electro-mechanical member comprises a screw that passes through an aperture formed through the internal circuit board and threadingly engages a mounting aperture formed in the electronic component. The screw is selected to break under a first tensile load which is lower as compared to a tensile load needed for breaking a coupler used to mechanically couple the electronic component to a housing of the electronic device.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

We claim:

1. A method for detecting removal or an attempted removal of an electronic component from an electronic device, comprising:
    disposing the electronic component on the electronic device such that a conductive surface of the electronic component contacts a ground conductor disposed on a first surface of an internal circuit board having perforations formed thereon;
    using an electro-mechanical member to mechanically couple the electronic component to the internal circuit board and to create an electrical path from the ground conductor to a sensing conductor disposed on a second surface opposed from the first surface of the internal circuit board; and
    sensing a break in the electrical path when an application of a force to the electro-mechanical member causes shearing of a portion of the printed circuit board at least partially surrounded by the perforations such that at least an electrical trace disposed on the internal circuit board breaks.

2. The method according to claim 1, wherein the electronic device is a communication device and the electronic component is an input/output connector for an accessory.

3. The method according to claim 1, wherein the electro-mechanical member passes through an aperture formed through the internal circuit board and threadingly engages a mounting aperture formed in the electronic component.

4. The method according to claim 1, wherein the electrical path is detected when the electro-mechanical member breaks.

5. The method according to claim 4, wherein the electro-mechanical member breaks in response to an application of a force to the electronic component.

6. A method for detecting removal or an attempted removal of an electronic component from an electronic device, comprising:
    disposing the electronic component on the electronic device such that a conductive surface of the electronic component contacts a ground conductor disposed on a first surface of an internal circuit board;
    using an electro-mechanical member to mechanically couple the electronic component to the internal circuit board and to create an electrical path from the ground conductor to a sensing conductor disposed on a second surface opposed from the first surface of the internal circuit board; and sensing a break in the electrical path;
wherein the electro-mechanical member is a screw which breaks under a first tensile load which is lower as compared to a tensile load needed for breaking a coupler used to mechanically couple the electronic component to a housing of the electronic device.

7. The method according to claim 1, wherein the electrical path is broken when a first portion of the internal circuit board adjacent to the sensing conductor breaks away from a remaining second portion of the internal circuit board.

8. The method according to claim 7, wherein the first portion breaks away from the remaining second portion of the internal circuit board in response to an application of a force to the electronic component.

9. The method according to claim 1, wherein the break in the electrical path is detected when a voltage supplied to a detector circuit of the electronic device is higher as compared to a voltage supplied to the detector circuit when the electrical path is not broken.

10. An electronic device, comprising:
a housing;
a circuit board disposed inside the housing;
at least one electronic component externally mechanically coupled to the housing and having a conductive surface contacting a ground conductor disposed on a first surface of the circuit board having perforations formed thereon;
an elongate electro-mechanical member mechanically coupling the electronic component to the circuit board and having a conductive surface forming an electrical path from the ground conductor to a sensing conductor disposed on a second surface opposed from the first surface of the circuit board; and
a detector circuit disposed inside the housing and electrically connected to the sensing conductor such that a breaking of the electrical path is detectable when an application of a force to the elongate electro-mechanical member causes shearing of a portion of the printed circuit board at least partially surrounded by the perforations.

11. The electronic device according to claim 10, wherein the electronic device is a communication device and the electronic component is an input/output connector for an accessory.

12. The electronic device according to claim 10, wherein the elongate electro-mechanical member passes through an aperture formed through the circuit board and threadingly engages a mounting aperture formed in the electronic component.

13. The electronic device according to claim 10, wherein the electrical path is detected when the elongate electro-mechanical member breaks.

14. The electronic device according to claim 13, wherein the elongate electro-mechanical member breaks in response to an application of a force to the electronic component.

15. An electronic device, comprising:
a housing;
a circuit board disposed inside the housing;
at least one electronic component externally mechanically coupled to the housing and having a conductive surface contacting a ground conductor disposed on a first surface of the circuit board;
an elongate electro-mechanical member mechanically coupling the electronic component to the circuit board and having a conductive surface forming an electrical path from the ground conductor to a sensing conductor disposed on a second surface opposed from the first surface of the circuit board; and
a detector circuit disposed inside the housing and electrically connected to the sensing conductor such that a breaking of the electrical path is detectable;
wherein the elongate electro-mechanical member is a screw which breaks under a first tensile load which is lower as compared to a tensile load needed for breaking a coupler used to mechanically couple the electronic component to the housing.

16. The electronic device according to claim 10, wherein the electrical path is broken when a first portion of the circuit board adjacent to the sensing conductor breaks away from a remaining second portion of the circuit board.

17. The electronic device according to claim 16, wherein the first portion breaks away from the remaining second portion of the circuit board in response to an application of a force to the electronic component.

18. The electronic device according to claim 10, wherein the break in the electrical path is detected when a voltage supplied to the detector circuit is higher as compared to a voltage supplied to the detector circuit when the electrical path is not broken.

* * * * *